United States Patent Office 2,962,472
Patented Nov. 29, 1960

2,962,472

POLYMERIZATION OF MONOOLEFINS IN A DISPERSION OF LITHIUM AND A PARTIALLY POLYMERIZED DIOLEFIN

Archibald P. Stuart, Media, Pa., assignor to Sun Oil Company, Philadelphia, Pa., a corporation of New Jersey No Drawing. Filed Nov. 22, 1957, Ser. No. 698,031

13 Claims. (Cl. 260—45.5)

This invention relates to a process for the polymerization of alpha-olefins, and more particularly relates to a process for the polymerization of alpha-olefins having from 2 to 8 carbon atoms to high molecular weight solid polymers.

The polymerization of conjugated diolefins by contacting a diolefin with a dispersion of lithium in an inert, liquid reaction medium has heretofore been described. However, the same dispersion of lithium is not effective for the polymerizaion of alpha-monoolefins to high molecular weight solid polymers. Although certain materials, such as titanium halides, used together with activators such as aluminum trialkyls, have been described as effective for the polymerization of alpha-olefins to high molecular weight polymers, such processes have not been satisfactory because of the low yields of solid polymers obtained and because of the difficulties in working with the described combination of catalytic components.

It has now been found that by contacting a dispersion of lithium in an inert, liquid reaction medium with a conjugated diolefin under conditions whereby the diolefin is polymerized to an extent not beyond incipient solid polymer formation, and contacting the resulting system with an alpha-olefin, the alpha-olefin is rapidly polymerized to high molecular weight solid polymers in good yields.

In accordance with an embodiment of the process of the invention, lithium metal is dispersed in an inert, liquid reaction medium. With the temperature of the dispersion adjusted to about 50° C., isoprene is bubbled into the dispersion in a quantity just sufficient for the incipient production of solid polymers. The addition of isoprene is then discontinued and propylene is introduced into the dispersion. The propylene is therein rapidly converted in good yields to high molecular weight solid polymers.

Saturated hydrocrabons and mixtures thereof are preferred for use as the inert, liquid reaction medium. Saturated hydrocarbons, such as the octanes, decanes, dodecanes, decahydronaphthalene and higher saturated hydrocarbons and mixtures thereof give good results. Especially advantageous results are obtained with saturated hydrocarbons which boil above about 200° C., since atmospheric pressures can be used therewith, if desired, in all of the steps of the process. Such saturated hydrocarbons are advantageously mixtures of saturated hydrocarbons from petroleum refinery operations. The boiling point of the reaction medium must be such that it is maintained in liquid phase under the conditions of temperature and pressure used in the several steps of the process. In forming the dispersion of lithium, it is advantageous to melt the lithium in the reaction medium by heating to a temperature sufficient to melt the lithium, say a temperature of above about 190° C., while maintaining rapid agitation of the system. After forming the dispersion, the temperature is advantageously reduced, while maintaining continued agitation, to within the range of from 0° C. to 100° C., and preferably from 30° C. to 70° C., for contacting with the conjugated diolefin. Isoprene is the preferred diolefin to employ but other conjugated diolefins having up to 6 carbon atoms, such as butadiene-1,3, pentadiene-1,3, 2-methyl pentadiene-1,3 and hexadiene-1,3 can be used with good results.

Alpha-olefins, i.e., olefins having a terminal olefinic bond, which can be polymerized in the process of the invention have from 2 to 8 carbon atoms per molecule and a hydrogen atom attached to the penultimate doubly bonded carbon atom. Normally gaseous olefins, including ethylene, propylene, butene-1, and mixtures thereof, for example, give good results, but the pentenes, hexenes, heptenes and octenes having a terminal olefinic bond can also be used with good results if the penultimate doubly bonded carbon bears a hydrogen atom.

As above described, in preparing the dispersion of lithium in the reaction medium, a temperature sufficient to cause melting of the lithium is preferred. Such temperature can be, for example, from about 190° C. to 220° C. The pressure useful for preparing the dispersion is not critical, so long as the liquid medium is maintained in the liquid phase. The pressure to employ during the polymerization of the diolefin does not appear critical and atmospheric pressure can be used with good results. However, somewhat elevated pressures, say up to about 1,000 p.s.i.g. (pounds per square inch gauge) can be used with good results. The quantity of lithium to employ should be about one part in from 1,000 to 10,000 parts of the liquid reaction medium. As used herein, "parts" refers to parts by weight. It is advantageous to prevent the formation of high molecular weight solids from the diolefins by limiting the quantity of diolefin introduced into the lithium dispersion such as by limiting the quantity thereof to from about 100 to 2000 parts per part of lithium, depending on the other variables employed. It is essential that the diolefin be partially polymerized prior to introducing the alpha-olefin into the system. However, the desired degree of polymerization can also be obtained by introducing the alpha-olefin to be polymerized after the desired quantity of polymerization of the diolefin has occurred. On introduction of the alpha-olefin, it appears that further polymerization is largely accomplished with the alpha-olefin rather than the diolefin. If desired, such as when a relatively large quantity of diolefin is initially employed, the unpolymerized diolefin can be removed from the lithium dispersion such as by displacement with an inert gas or with the alpha-olefin.

The amount of polymerization of the diolefin does not appear critical so long as solid polymers beyond the incipient stage are not formed. By "incipient production of solid polymers," and terms of similar import as used herein, is meant polymerization to the extent where solid polymers first appear in the reaction medium. Incipient solid polymer formation is not essential to the process, but polymerization to form at least the dimer of the diolefin should be performed to obtain good results.

After partial polymerization of the diolefin, an alpha-olefin is introduced into the dispersion. For polymerization of the alpha-olefin, the temperature may advantageously remain the same or a somewhat higher temperature can be used. The temperature during polymerization should be maintained within the range of from 0° C. to 200° C., and preferably is maintained in the range of from 20° C. to 130° C. Atmospheric pressure can be employed but elevated pressures, say up to about 1,000 p.s.i.g., give a higher rate of polymerization, and even higher pressures can be employed without deleterious results.

To illustrate the process of the invention, one part of lithium is dispersed in 5,000 parts of a solvent consisting of a mixture of saturated hydrocarbons having a boiling range of from about 200° C. to 250° C. and maintained at a temperature of about 195° C., rapid agitation being used to effect the dispersion. Isoprene is then bubbled into the dispersion maintained at atmospheric pressure and a temperature of about 60° C. until the formation of solid polymer is just noticeable. The introduction of isoprene is discontinued and propylene is bubbled into the dispersion. The addition of propylene is performed rapidly until the pressure in the reactor is about 200 p.s.i.g. The pressure falls immediately, thus indicating polymerization of the propylene. Additional propylene is introduced into the reactor to maintain the pressure at about 200 p.s.i.g. The temperature during the polymerization of propylene is maintained in the range of from about 60° C. to 70° C. After 4 hours the reactor is vented to reduce the pressure to atmospheric and water added to the reactor to deactivate the catalyst. After comminuting the solid polymer product with water, washing and drying, there is recovered about 400 parts of solid polymer per part of lithium employed. The polymer appears as a white, granular solid.

The polymer products of the invention are white, granular solids having properties which make them especially suitable for forming into articles of manufacture by extrusion techniques. It is believed that a relatively short segment of the polymer chain is formed from the diolefin, with the remainder of the chain formed from the alpha-olefin, and that this configuration enhances those properties of the polymer, such as melt index and melting point, which make it especially useful in extrusion processes. Other techniques of forming the polymer into articles of manufacture, such as by molding, can also be used. The polymer products are especially useful as conduits or containers for fluids, as wrapping material for packaging when formed into thin sheets, and the like.

When other conjugated diolefins are substituted for isoprene and/or when other alpha-olefins are substituted for propylene within the limits above described, substantially equivalent results are obtained.

In a further embodiment of the process of the invention, after partial polymerization of the diolefin and prior or simultaneously with the introduction of the alpha-olefin, a metal halide is incorporated into the system. For example, isoprene is contacted with a dispersion of lithium to produce incipient formation of solid polymers. Nitrogen is then bubbled into the dispersion so that unreacted isoprene is removed therefrom and from the reactor. Titanium trichloride particles are then dispersed into the system followed by the introduction of propylene. This embodiment is especially valuable when the formation of a crystalline polymer such as crystalline polypropylene is desired. Metal halides which can be used are the chlorides, fluorides, bromides and iodides of the metals of groups III, IV, V and VI of the periodic table. Titanium tetrachloride, titanium trichloride, zirconium tetrachloride, chromium trichloride, molybdenum trichloride, cadmium dichloride, and the fluoride, bromide and iodide analogues thereof illustrate metal halides which can be used with good results. The quantity of metal halide to use can be varied substantially with good results, but generally a mole ratio thereof to lithium of from 0.5:1 to 20:1 will be used. Other means of incorporating the metal halide into the reaction system such as by introducing a slurry of titanium trichloride particles in the inert, liquid reaction medium containing dissolved alpha-olefin into the system containing partially polymerized diolefin gives good results.

In a further embodiment of the invention, the lithium-diolefin product is separated from the reaction medium, such as by filtering or centrifuging, and is redispersed in another inert liquid reaction medium for contacting with the olefin. This embodiment is advantageously used when it is desired to polymerize the diolefin in a relatively high boiling reaction medium, and to thereafter polymerize the alpha-olefin in a lower boiling reaction medium.

The invention claimed is:
1. A process for polymerizing alpha-mono-olefins which comprises contacting at a temperature of from 0° C. to 100° C. a dispersion of lithium in an inert liquid saturated hydrocarbon medium with a conjugated diolefin having from 4 to 6 carbon atoms whereby diolefin polymers not beyond the incipient solid polymer stage are formed, and then contacting the resultant reaction product with an alpha-olefin having from 2 to 8 carbon atoms at a temperature of from 20° C. to 130° C., and recovering a solid polymer reaction product.
2. Process according to claim 1 wherein said conjugated diolefin is butadiene-1,3.
3. Process according to claim 1 wherein said conjugated diolefin is isoprene.
4. Process according to claim 1 wherein said conjugated diolefin is pentadiene-1,3.
5. Process according to claim 1 wherein said conjugated diolefin is 2-methylpentadiene-1,3.
6. Process according to claim 1 wherein said conjugated diolefin is hexadiene-1,3.
7. Process according to claim 1 wherein said alpha-monoolefin is ethylene.
8. Process according to claim 1 wherein said alpha-monoolefin is propylene.
9. Process according to claim 1 wherein said alpha-monoolefin is a mixture of ethylene and propylene.
10. Process according to claim 1 wherein said alpha-monoolefin is butene-1.
11. Process according to claim 1 wherein said alpha-monoolefin is a mixture of propylene and butene-1.
12. Process for polymerizing alpha-olefins which comprises contacting, at a temperature of from about 0° C. to 100° C., a dispersion of lithium in an inert liquid saturated hydrocarbon reaction medium with a conjugated diolefin having from 4 to 6 carbon atoms whereby diolefin polymers not beyond the incipient solid polymer stage are formed, dispersing particles of a metal halide selected from the group consisting of titanium tetrachloride, titanium trichloride, zirconium tetrachloride, chromium tetrachloride, molybdenum trichloride, and cadmium dichloride in the reaction mixture, contacting the resultant dispersion with a normally gaseous alpha-monoolefin at a temperature of from 20° C. to 130° C., and recovering a solid polyolefin reaction product.
13. Process according to claim 12 wherein said metal halide is titanium trichloride.

References Cited in the file of this patent
UNITED STATES PATENTS 2,512,697    Te Grotenhuis    June 27, 1950
2,762,790    Greene    Sept. 11, 1956

OTHER REFERENCES

Ziegler: "Chemiker-Zeitung," volume 62, No. 14 (1938), pages 125–127.